United States Patent
Kaynak et al.

(10) Patent No.: US 12,321,613 B2
(45) Date of Patent: Jun. 3, 2025

(54) BIT FLIPPING DECODER WITH OPTIMIZED MAXIMUM ITERATIONS FOR VARIED BIT FLIPPING THRESHOLDS

(71) Applicant: Micron Technology, Inc., Boise, ID (US)

(72) Inventors: Mustafa N. Kaynak, San Diego, CA (US); Eyal En Gad, Highland, CA (US); Sivagnanam Parthasarathy, Carlsbad, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 22 days.

(21) Appl. No.: 18/521,574

(22) Filed: Nov. 28, 2023

(65) Prior Publication Data

US 2024/0176509 A1 May 30, 2024

Related U.S. Application Data

(60) Provisional application No. 63/428,621, filed on Nov. 29, 2022.

(51) Int. Cl.
*G11C 11/00* (2006.01)
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .... G06F 3/0619; G06F 3/0655; G06F 3/0679; G11C 11/00
See application file for complete search history.

(56) References Cited

U.S. PATENT DOCUMENTS

| | | | |
|---|---|---|---|
| 8,429,498 B1 * | 4/2013 | Anholt | G06F 11/1048 |
| | | | 714/764 |
| 10,797,728 B1 * | 10/2020 | Varnica | H03M 13/3707 |
| 11,108,407 B1 * | 8/2021 | Lu | H03M 13/1111 |
| 11,146,290 B1 * | 10/2021 | Xiong | H03M 13/1111 |
| 11,967,970 B2 * | 4/2024 | Zhang | H03M 13/1108 |
| 12,034,455 B2 * | 7/2024 | Kumar | G06F 11/1048 |
| 2019/0238158 A1 | 8/2019 | Bhatia et al. | |
| 2021/0089389 A1 | 3/2021 | Kaynak et al. | |

(Continued)

OTHER PUBLICATIONS

International Search Report and Written Opinion, PCT App. No. PCT/US2023/081384, Apr. 2, 2024, 08 pages.

*Primary Examiner* — Esaw T Abraham
(74) *Attorney, Agent, or Firm* — NICHOLSON DE VOS WEBSTER & ELLIOTT LLP

(57) ABSTRACT

A of bit flipping (BF) decoder decodes codewords using a first set of BF thresholds. A first minimum number of iterations of decoding performed on the codewords is determined to achieve a first target decoding rate. Codewords are decoded using a second set of BF thresholds. The first set of BF thresholds are more likely to cause bit flips than the second set of BF thresholds. A second minimum number of iterations of decoding performed on the codewords is determined to achieve a second target decoding rate. Bits in a codeword are flipped using the first set of BF thresholds for the first minimum number of iterations. Bits are flipped in the codeword using the second set of BF thresholds in response to determining the codeword remains undecoded as a result of the first minimum number of iterations.

20 Claims, 5 Drawing Sheets

(56) References Cited

U.S. PATENT DOCUMENTS

2021/0250045 A1 8/2021 Ha et al.
2022/0190845 A1 6/2022 Asadi et al.
2022/0321144 A1 10/2022 Kaynak et al.

* cited by examiner

BIT FLIPPING DECODER WITH OPTIMIZED MAXIMUM ITERATIONS FOR VARIED BIT FLIPPING THRESHOLDS

CROSS-REFERENCE TO RELATED APPLICATION

The present application claims the benefit of U.S. Provisional Patent Application No. 63/428,621, filed on Nov. 29, 2022, which is hereby incorporated by reference.

TECHNICAL FIELD

The present disclosure generally relates to error correction in memory devices, and more specifically, relates to optimizing the maximum iteration count of each of a set of iterations using an aggressive bit flipping threshold and a set of iterations using a conservative bit flipping threshold in a bit flipping decoder.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
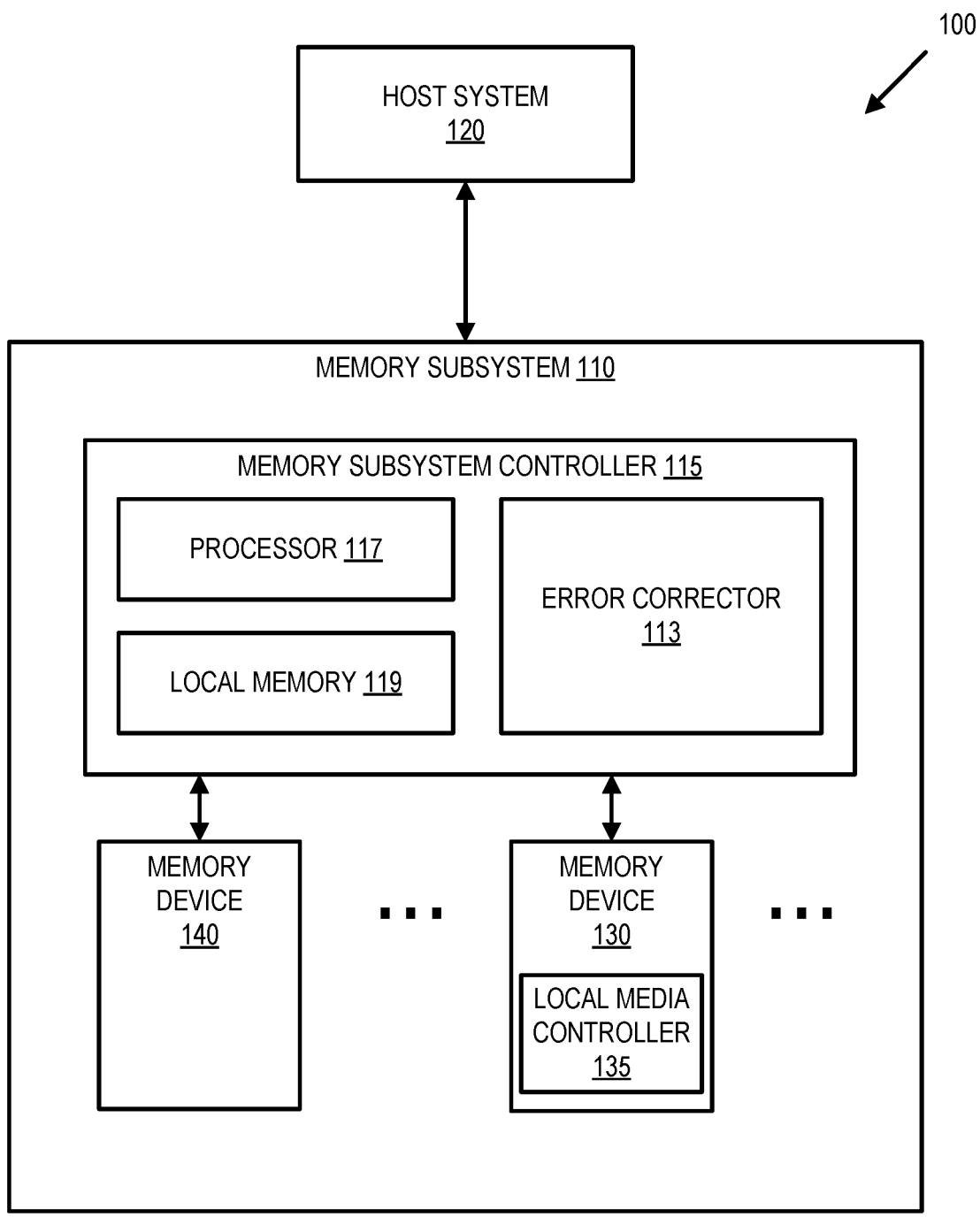
FIG. 1 illustrates an example computing system that includes a memory subsystem in accordance with some embodiments of the present disclosure.

Aspects of the present disclosure are directed to a bit flipping decoder using a least reliable bit energy function value to bypass one or more iterations of decoding in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, an SLC can store one bit of information and has two logic states.

Low-Density Parity Check (LDPC) codes are commonly used for enabling error correction in memory subsystems. LDPC codes are a class of highly efficient linear block codes that include single parity check (SPC) codes. LDPC codes have a high error correction capability and can provide performance close to Shannon channel capacity. LDPC decoders utilize a "belief propagation" algorithm, which is based on the iterative exchange of reliability information, e.g., "beliefs." The MinSum algorithm (MSA), which is a simplified version of the belief propagation algorithm, can be used for decoding LDPC codes. MSA-based decoders use a relatively high amount of energy per bit (e.g., pico-joule per bit) for decoding codewords and hence are not well suited for energy conscious applications, such as mobile applications.

Bit Flipping (BF) decoders have been introduced to address this problem. BF decoders use less energy per bit with the tradeoff of a lower error correction capability than MSA-based decoders. In each iteration of decoding, a BF decoder evaluates each bit and flips the least reliable bits to correct errors. The least reliable bits are identified by comparison of a threshold value (BF threshold) to an energy function value for each bit. Bit flipping thresholds can be determined, e.g., based on a heuristic process and/or optimized using machine learning algorithm. Additionally, bit flipping thresholds can vary between iterations of decoding. An aggressive set of BF thresholds results in flipping more bits per iteration and faster decoding, for lower bit error rates, but with a higher codeword error rate (i.e., BF decoder failures), when the bit error rate is not low. This higher codeword error rate can trigger additional error handling, such as using another decoding process, reducing the benefits of using a BF decoder. A conservative set of BF thresholds is better suited for higher bit error rates and results in lower codeword error rate but operates at a slower pace, resulting in higher decoder latency.

Aspects of the present disclosure address the above and other deficiencies by determining and applying an optimized balance of aggressive and conservative sets of BF thresholds. The bit flipping decoder can use a target result (e.g., code word error rate), the result of a full set of iterations using aggressive BF thresholds, and the result of a full set of iterations using conservative BF thresholds to determine a maximum number of iterations less than the full set of iterations for using a set of aggressive BF thresholds and a maximum number of iterations less than the full set of iterations for using a set of conservative BF thresholds. As a result of using a combination of the determined sets of aggressive and conservative BF thresholds, the BF decoder can meet the target result in the decoding process with improved latency.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130/140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110. including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an error corrector 113 that can encode and decode data stored in the memory device (e.g., an encoder and/or a decoder). In some embodiments, the controller 115 includes at least a portion of the error corrector 113. For example, the controller 115 can include a processor 117 (processing device) configured to execute instructions stored in local memory 119 for performing the operations described herein. In some embodiments, the error corrector 113 is part of the host system 120, an application, or an operating system.

Encoding data using an error correcting code (ECC) allows for correction of erroneous data bits when the data is retrieved from the memory device. For example, the error corrector 113 can encode data received from the host system 120 and store the data and parity bits as codewords in the memory device 130. The error corrector 113 can further decode data stored in the memory device 130 to identify and correct erroneous bits of the data before transmitting corrected data to the host system 120. Although illustrated as a single component that can perform encoding and decoding of data, the error corrector 113 can be/include separate components. In some embodiments, the error corrector 113 encodes data according to a low-density parity-check (LDPC) code.

The error corrector 113 decodes the codewords stored in the memory device 130 using a BF decoder. For example, the error corrector 113 receives a codeword stored in a memory device 130. The error corrector 113 error corrects the codeword in a set of iterations, e.g., by flipping bits for one or more iterations using energy function values for the bits and the corresponding BF threshold for each iteration. The energy function value of a codeword bit is an indication of reliability for the codeword bit. In some embodiments, an energy function value of a codeword bit is determined based on a number of parity violations per codeword bit and channel information. The channel information is determined based on a current state of the bit (e.g., after one or more iterations of the BF decoder) versus the state of the bit as read from the memory device (also referred to as hard bit). As described below, the error corrector 113 implements an enhanced BF decoder that can perform bit flipping decoding determining and applying an optimized balance of aggressive and conservative sets of BF thresholds to meet a target decoding outcome. Further details with regards to the operations of the error corrector 113 are described below.

Figure 2:
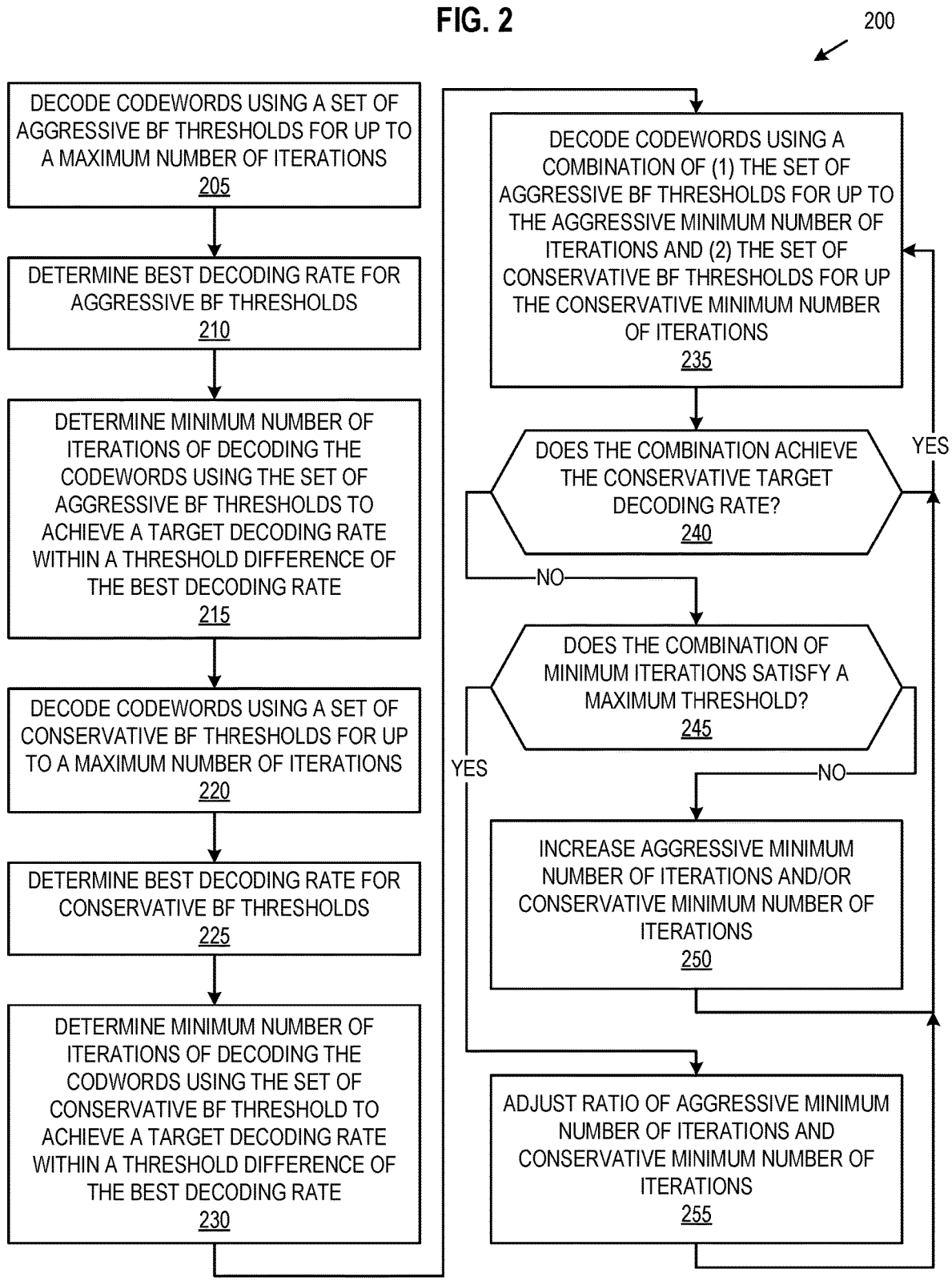
FIG. 2 is a flow diagram of an example method that determines and applies an optimized balance of aggressive and conservative sets of bit flipping thresholds for iterations of decoding by a bit flipping decoder in accordance with some embodiments of the present disclosure.

FIG. 2 is a flow diagram of an example method 200 that determines and applies an optimized balance of aggressive and conservative sets of bit flipping thresholds for iterations of decoding by a bit flipping decoder, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error corrector 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device decodes codewords using a set of aggressive BF thresholds. For example, the error corrector 113 receives a request to decode a list of codewords to determine the BF decoding performance using the aggressive BF thresholds. In each iteration, the error corrector 113 determines energy function values for bits of the codeword. An energy function of a codeword bit is an indication of reliability information for the bit. The error corrector 113 can determine an energy function value for a bit of the codeword based on the number of unsatisfied parities for the bit and channel information for that bit. In some embodiments, a higher number of unsatisfied parities for a bit is an indication of a less reliable bit and results in a higher energy function value for the bit. Similarly, a lower number of unsatisfied parities (higher number of satisfied parities) for the bit is an indication of a more reliable bit and results in a lower energy function value for the bit. The channel information is determined based on a current state of the bit as compared to the state of the bit when it was read from a memory device. For example, the channel information of a bit can be defined as an XOR of the current state of the bit, which may have been flipped during one or more iterations of decoding, and the bit read as from the memory device. In such an example, the channel information has a value of "1" for a mismatch and "0" when the current state of the bit matches the state of the bit when read. When the current state of the bit agrees with the state of the bit when read from the memory device, the bit is considered to be more reliable. In a non-limiting example, an energy function can be determined according to equation (1):

$$c(bit) = \text{NumberParityViolations}(bit) + \text{Channel information}(bit) \quad (1)$$

An energy function value of a bit is lower when the current state of the bit agrees with the hard bit received from the memory device than when the current state of the bit does not agree with the hard bit. In one embodiment, the error corrector 113 determines the energy function value of a bit of the codeword by retrieving the energy function value from a look up table based on the number of parity violations for a bit and the channel information for the bit.

Again, in the example above, a higher e(bit) value indicates a less reliable bit and lower e(bit) value indicates a more reliable bit. In other embodiments, a high energy function value of a bit is indicative of a more reliable bit and a low energy function value of a bit is indicative of a less reliable bit. In such an embodiment, an energy function can be determined, e.g., by adding the number of satisfied parities with the negative of the channel information value. In some embodiments, the error corrector 113 determines the energy function values using scalar values and/or weighted values in addition to parity and channel information. For example, different rows, columns, or other distinct locations within a memory can be determined to be more reliable or less reliable. As such, the error corrector 113 can scale or weight the energy function values for bits in those locations.

In addition to determining the energy function value for each bit, the error corrector 113 flips those bits that satisfy the BF threshold for the current iteration of the BF decoder. When the energy function value of a bit of the codeword does not satisfy the BF threshold, the error corrector 113 does not flip the bit. When the energy function value of a bit of codeword satisfies the BF threshold, the error corrector 113 flips the bit. For example, the error corrector 113 can flip a bit when the energy function value of the bit is greater than or equal to the BF threshold and to not flip the bit when the energy function value of the bit is less than the BF threshold.

Different iterations can have different BF thresholds. For example, the error corrector 113 increments the iteration count to proceed to the next iteration. The error corrector 113 uses the current iteration count to look up or otherwise determine the current BF threshold. The set of aggressive BF thresholds result in a higher likelihood of a bit being flipped than, e.g., a set conservative BF thresholds (described below).

Additionally, the error corrector 113 can use the iteration count to determine if a stop condition/criterion is satisfied. A stop criterion can include an indication that no errors are detected for the codeword, leading to the error corrector 113 providing the decoded codeword as an output. In some embodiments, the stop criterion can include a null syndrome (i.e., zero unsatisfied parities) indicating that the codeword no longer includes erroneous bits. To prevent excessive delay in decoding, the stop criterion can include a maximum number of iterations or a maximum amount of time. For example, when the error corrector 113 performs the maximum number of iterations (e.g., 30 iterations, 40 iterations, 100 iterations, etc.) without reaching a null syndrome, the error corrector 113 outputs an indication of error/decoding failure and a number of bit errors in the codeword.

In one embodiment, the indication of the number of bit errors is a bit error rate or similar metric of the initial state of the codeword when read from memory. For example, the error corrector 113 can determine and store an initial syndrome value for the codeword to track decoding performance (e.g., codeword error rate) for different bit error rates. Additionally, the error corrector 113 can track decoding performance for different iteration counts. For example, the error corrector 113 tracks the codeword error rate (CWER) for different bit error rates (BER) at each or some other increment of iteration count to evaluate decoder performance at different iteration counts (i.e., the CWER if the current iteration count was the stopping condition).

At operation 210, the processing device determines the best decoding rate for the set of aggressive BF thresholds. For example, the error corrector 113 uses the metrics of the CWER for different BER to determine the set of bit error rate values at which the aggressive BF thresholds fail to decode codewords as described above. The best decoding rate for the BF thresholds refers to the CWER for different BER when using the maximum number of iterations as a stopping condition (rather than intermediate values of CWER tracked for iteration counts less than the maximum).

At operation 215, the processing device determines a minimum number of iterations of decoding the codewords using the set of aggressive BF thresholds to achieve a target decoding rate. In one embodiment, the target decoding rate represents when one or more CWER values per BER is within a threshold difference of the best decoding rate. For example, the error corrector 113 uses a target decoding rate that is a CWER within an order of magnitude of the best decoding rate. Using hypothetical values, if the CWER for one or more BER values at iteration five is within an order of magnitude of the best CWER for a maximum iteration count of thirty, but iterations lower than five have CWER value(s) greater than an order of magnitude different from the best CWER, the error corrector 113 determines that five iterations is the minimum number of iterations to achieve the target decoding rate. In other embodiments, the target decoding rate is another threshold difference, such as a fixed value rather than an order of magnitude. Alternatively, the target decoding rate is a fixed value rather than a value determined relative to the best decoding rate.

At operation 220, the processing device the processing device decodes codewords using a set of conservative BF thresholds. For example, the error corrector 113 decodes a list of codewords to determine the BF decoding performance using the conservative BF thresholds in a manner similar to the description of operation 205 above. The set of conservative BF thresholds results in a lower likelihood of a bit being flipped than, e.g., the set aggressive BF thresholds. In one embodiment, the error corrector 113 decodes the same set of codewords using both sets of BF thresholds. For example, the error corrector 113 can decode each codeword using aggressive BF thresholds in parallel with decoding the codeword using conservative BF thresholds. Alternatively, the error corrector 113 can store a copy of the codeword as read from memory (including bits in error) and perform the decoding using aggressive BF thresholds in one pass of iterations and using the conservative BF thresholds in another, sequential pass of iterations. Determining the BF decoding performance using conservative and aggressive BF thresholds can be in any order, overlapping, or in parallel.

At operation 225, the processing device the processing device determines the best decoding rate for the set of conservative BF thresholds. For example, the error corrector 113 uses the metrics of the CWER for different BER to determine the set of bit error rate values at which the conservative BF thresholds fail to decode codewords in a manner similar to the description of operation 210 above.

At operation 230, the processing device the processing device determines a minimum number of iterations of decoding the codewords using the set of conservative BF thresholds to achieve a target decoding rate. For example, the error corrector 113 determines the minimum number of iterations in a manner similar to the description of operation 215 above. In one embodiment, the error corrector 113 uses the same threshold difference of the best decoding rate to determine of the target decoding rate for both the aggressive BF thresholds and the conservative BF thresholds (e.g., an order of magnitude). In another embodiment, the error corrector 113 uses different threshold differences to determine the different minimum number of iterations.

Using conservative BF thresholds, the error corrector 113 will flip fewer bits per iteration, increasing the decoder latency. As a result, the error corrector 113 will likely determine a minimum number of iterations using the set of conservative BF thresholds that is higher than the minimum determined using the set of aggressive BF thresholds. Again, using hypothetical values for decoding with conservative BF thresholds, if the CWER for one or more BER values at iteration fifteen is within an order of magnitude of the best CWER for a maximum iteration count of thirty, but iterations lower than fifteen have CWER value(s) greater than an order of magnitude different from the best CWER, the error corrector 113 determines that fifteen iterations is the minimum number of iterations to achieve the target decoding rate.

At operation 235, the processing device decodes codewords using a combination of the set of aggressive BF thresholds for up to the minimum number of iterations determined to achieve the target decoding rate (e.g., described with reference to operation 215) and the set of conservative BF thresholds for up to the minimum number of iterations determined to achieve the target decoding rate (e.g., described with reference to operation 230). Using the hypothetical values from the operations above, the error corrector 113 decodes a codeword using the aggressive bit flipping thresholds for up to five iterations and, if the codeword remains undecoded (i.e., still has one or more unsatisfied parities), the error corrector 113 decodes the codeword using the conservative bit flipping thresholds for up to fifteen iterations. As a result, this combined approach has an effective maximum iteration count of twenty iterations.

In one embodiment, the error corrector 113 resets the codeword when switching between aggressive BF thresholds and conservative BF thresholds. For example, the BF decoding process includes the error corrector 113 storing a copy of the codeword as originally read from memory (i.e., including bits in error) which is used to compute the channel information. With the reset, the decoder starts working with the original data read from memory.

In one embodiment, the error corrector 113 decodes the same set of codewords used to independently test both sets of BF thresholds as described above with reference to operations 205 and 220. Alternatively, or additionally, the error corrector 113 can decode a different set of codewords using the combined set of BF thresholds. For example, the error corrector 113 can evaluate and adjust the minimum number of iterations for each set of BF thresholds when used in combination using an initial test set of codewords and/or using "live" data dynamically over the lifetime of the memory subsystem 110.

At operation 240, the processing device determines if the combination of the set of aggressive BF thresholds and the set of conservative BF thresholds for the corresponding minimum numbers of iterations achieves the target decoding rate for the conservative set of BF thresholds. For example, the error corrector 113 stores one or more CWER values or similar decoding rate values determined above at operation 225. The error corrector 113 determines if the CWER or similar decoding rate using the combined sets of BF thresholds is within an order of magnitude or similar threshold difference of this best decoding rate. In another embodiment, the error corrector 113 uses a different target decoding rate (e.g., the aggressive target decoding rate) or a different threshold difference than used in the operations above.

If the combination of aggressive and conservative BF thresholds achieves the target decoding rate, the method 200 returns to operation 235 and continues decoding codewords using the combined approach with the determined minimum iteration counts. If the combination of aggressive and conservative BF thresholds does not achieve the target decoding rate, the method 200 proceeds to operation 245.

At operation 245, the processing device determines if combination of minimum iterations satisfies a maximum threshold. For example, the error corrector 113 determines if the sum of the minimum number of iterations using aggressive BF thresholds and the minimum number of iterations using conservative BF thresholds is equal to the maximum number of iterations described with reference to operation 220. If the combination of minimum iterations does not satisfy maximum threshold, the method 200 proceeds to operation 250. If the combination of minimum iterations satisfies maximum threshold, the method 200 proceeds to operation 255.

At operation 250, the processing device increases one or both of the minimum number of iterations. Using the hypothetical numbers in the examples above, the error corrector 113 can increase the minimum number of iterations for the conservative BF thresholds from fifteen to sixteen, increasing the maximum number of iterations for the combined approach from twenty to twenty-one. With the adjusted minimum value(s), the method 200 returns to operation 235 to resume decoding codewords and determining if the adjustment allows the combination to achieve the target decoding rate.

At operation 255, the processing device adjusts a ratio of the aggressive BF threshold minimum number of iterations and conservative BF threshold minimum number of iterations. For example, when no longer able to continue to increase the maximum number of iterations of the combined approach, the error corrector 113 can move a count of one or more iterations from the minimum number of iterations for the aggressive BF thresholds to the minimum number of iterations for the conservative BF thresholds. With the adjusted minimum value(s), the method 200 returns to operation 235 to resume decoding codewords and determining if the adjustment allows the combination to achieve the target decoding rate.

Figure 3:
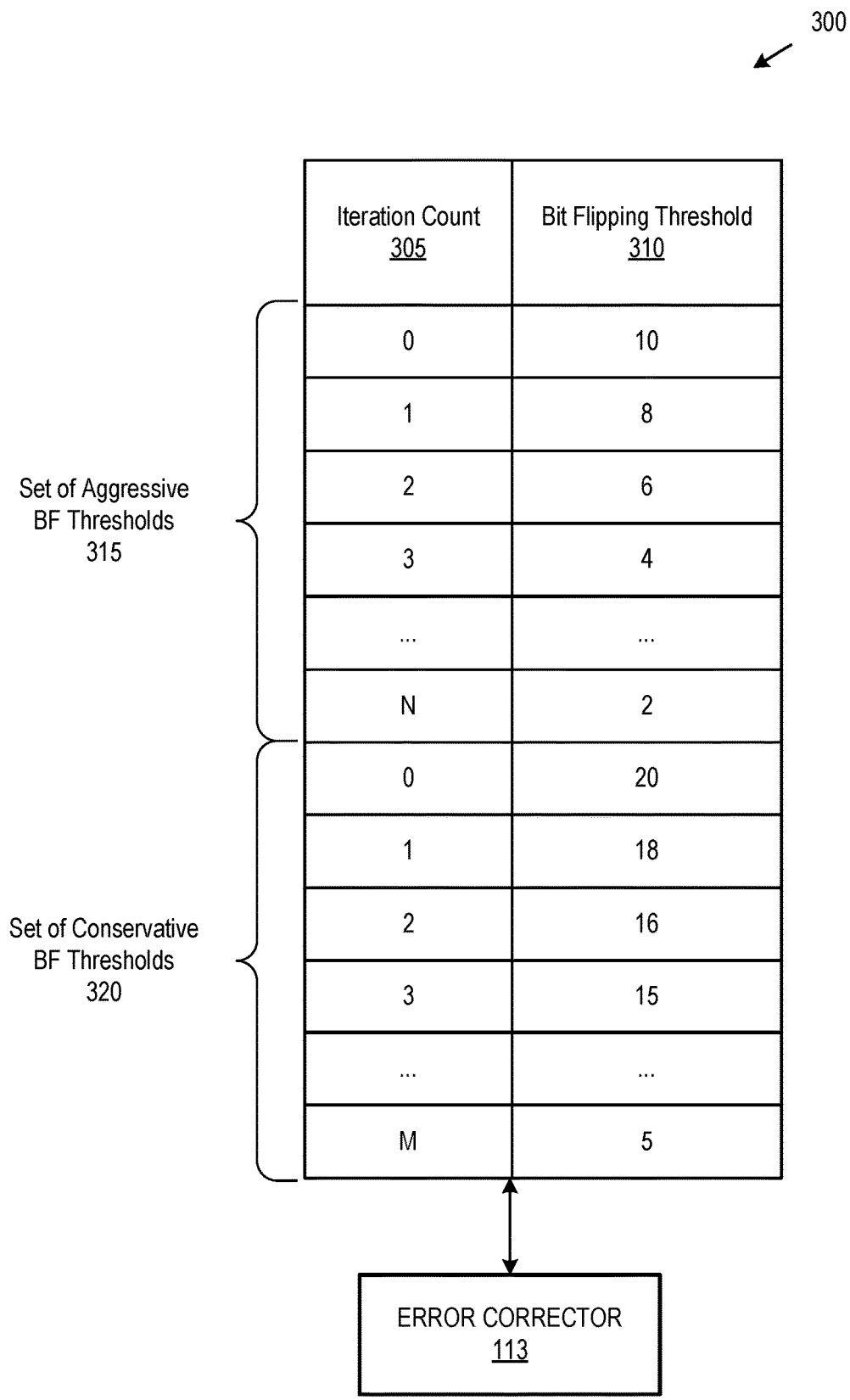
FIG. 3 illustrates a block diagram including an exemplary table of bit flipping thresholds for iterations of a bit flipping decoder in accordance with some embodiments.

FIG. 3 illustrates a block diagram including an exemplary table 300 of bit flipping thresholds for iterations of a bit flipping decoder, in accordance with some embodiments. Although FIG. 3 illustrates particular examples of iteration counts and bit flipping thresholds, the illustrated examples should be understood only as examples. Other mappings of iteration count to bit flipping thresholds are possible.

Table 300 includes an iteration counts 305 and BF threshold values 310 per iteration. The iteration count 305 ranges from 0 to the determined minimum, N, for a set of aggressive BF thresholds 315 and from 0 to the determined minimum, M, for a set of conservative BF thresholds 320. Using the hypothetical values in the examples above, N would initially be set to a value of five and M would initially be set to a value of 15.

As described above, the error corrector 113 determines an energy function value for a bit based on its associated number of unsatisfied parities and channel information. Using the determined energy function values, the error corrector 113 determines whether or not to flip each bit based on a comparison of the energy value for the bit with the BF threshold for the current iteration. In an embodiment in which higher energy function values correlate to less reliable bits, lower BF thresholds result in more bit flips. Accordingly, the illustrated set of aggressive BF thresholds 315 include values that are lower than those of the set of conservative BF thresholds 320, resulting in more bits flipped when using the aggressive BF thresholds 315 than with the conservative BF thresholds 320.

Figure 4:
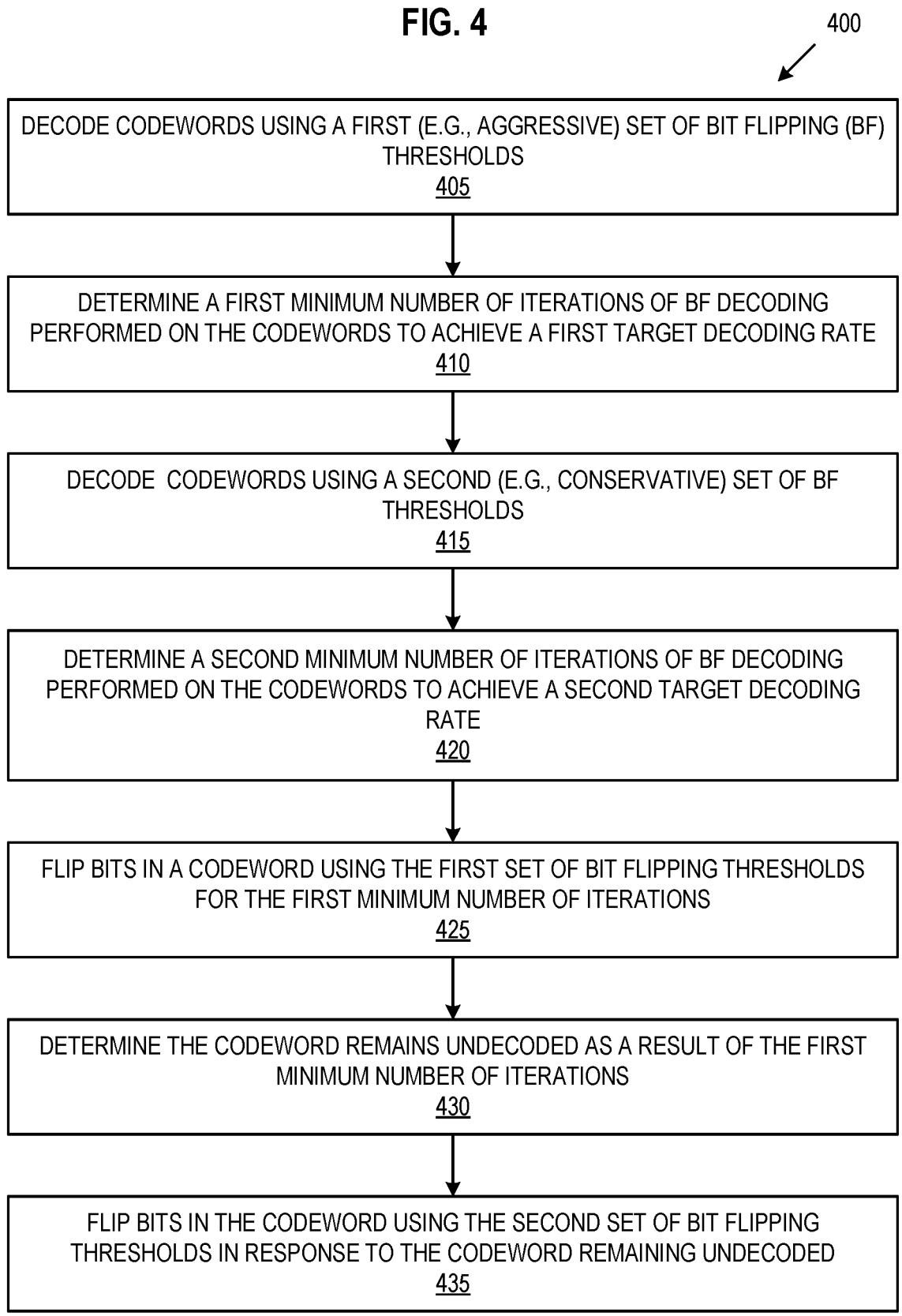
FIG. 4 is a flow diagram of another example method that determines and applies an optimized balance of aggressive and conservative sets of bit flipping thresholds for iterations of decoding by a bit flipping decoder in accordance with some embodiments of the present disclosure.

FIG. 4 is a flow diagram of another example method 400 that determines and applies an optimized balance of aggressive and conservative sets of bit flipping thresholds for iterations of decoding by a bit flipping decoder, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error corrector 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device decodes codewords using a first set of BF thresholds. For example, the error corrector 113 decodes a list of codewords to determine the BF decoding performance using the aggressive BF thresholds as described with reference to operation 205 above.

At operation 410, the processing device determines a first minimum number of iterations of BF decoding using the first set of BF thresholds to achieve a target decoding rate. For example, the error corrector 113 determines the best decoding rate for the set of aggressive BF thresholds and a minimum number of iterations to achieve a target decoding rate within a threshold difference of the best decoding rate as described with reference to operations 210 and 215 above.

At operation 415, the processing device decodes codewords using a second set of BF thresholds. For example, the error corrector 113 decodes a list of codewords to determine the BF decoding performance using the conservative BF thresholds as described with reference to operation 220 above.

At operation 420, the processing device determines a second minimum number of iterations of BF decoding using the second set of BF thresholds to achieve a target decoding rate. For example, the error corrector 113 determines the best decoding rate for the set of conservative BF thresholds and a minimum number of iterations to achieve a target decoding rate within a threshold difference of the best decoding rate as described with reference to operations 225 and 230 above.

At operation 425, the processing device flips bits in a codeword using the first set of BF thresholds for the first minimum number of iterations. For example, similar to the description of operation 235, the error corrector 113 attempts to decode the codeword using the aggressive set of BF thresholds for the minimum number of iterations determined at operation 410.

At operation 430, the processing device determines that the codeword remains undecoded as a result of performing BF decoding using the first set of BF thresholds for the first minimum number of iterations. For example, the error corrector 113 determines that one or more unsatisfied parities remain following the determined number of iterations of aggressive BF thresholds as described above with reference to operation 235.

At operation 435, the processing device bits in a codeword using the second set of BF thresholds for the second minimum number of iterations. For example, similar to the description of operation 235, the error corrector 113 resets the error vector and attempts to decode the codeword using the conservative set of BF thresholds for the minimum number of iterations determined at operation 420.

Figure 5:
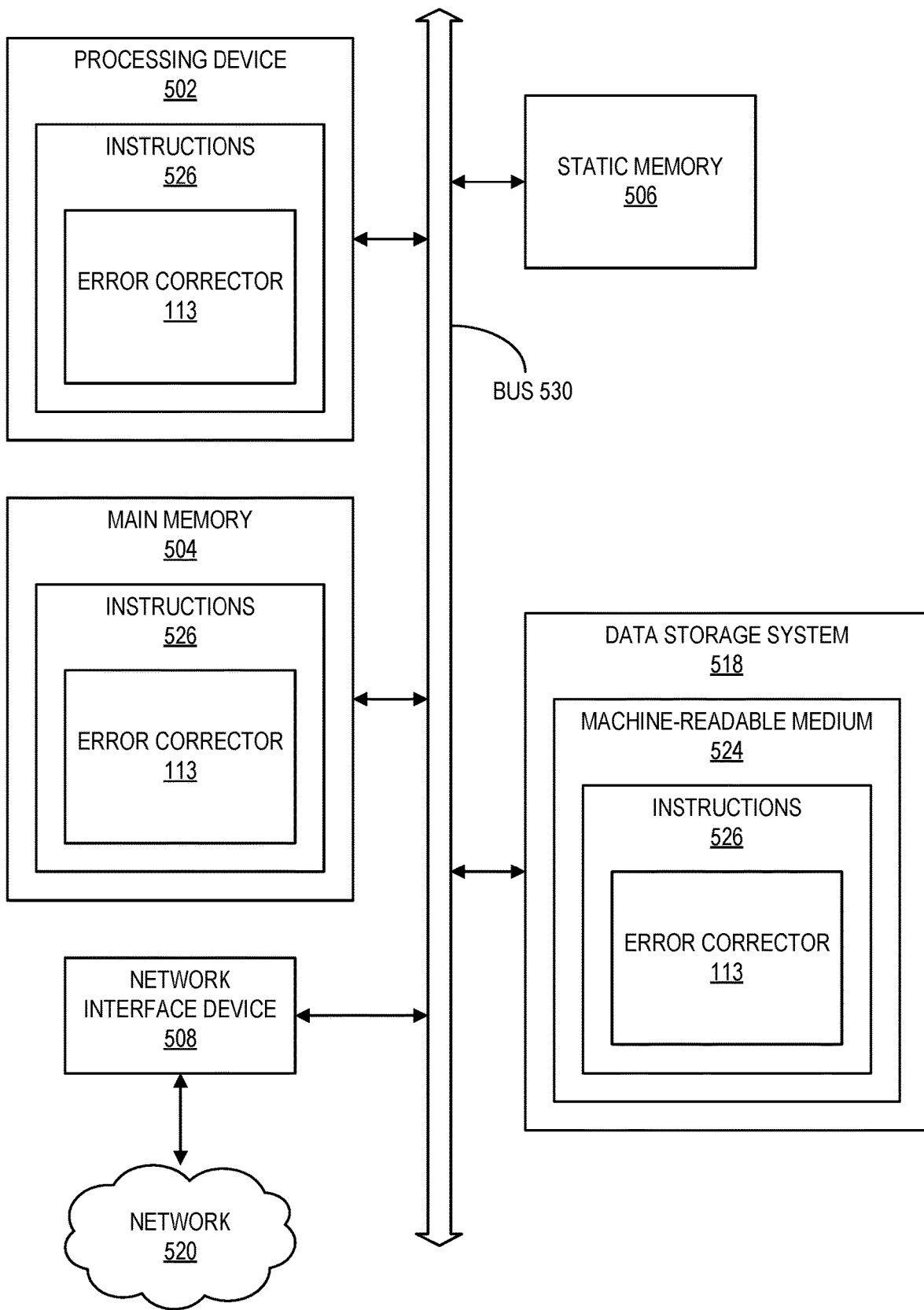
FIG. 5 is a block diagram of an example computer system in which embodiments of the present disclosure can operate.

FIG. 5 illustrates an example machine of a computer system 500 within which a set of instructions for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the error corrector 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a bit flipping decoder (e.g., as implemented by the error corrector 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
decoding a first plurality of codewords using a first set of bit flipping thresholds;
determining a first minimum number of iterations of bit flipping decoding performed on the first plurality of codewords to achieve a first target decoding rate;
decoding a second plurality of codewords using a second set of bit flipping thresholds, wherein the first set of bit flipping thresholds are more likely to cause the bit flipping decoding to flip bits than the second set of bit flipping thresholds;
determining a second minimum number of iterations of bit flipping decoding performed on the second plurality of codewords to achieve a second target decoding rate;
flipping bits in a codeword using the first set of bit flipping thresholds for the first minimum number of iterations;
determining the codeword remains undecoded as a result of the first minimum number of iterations; and
flipping bits in the codeword using the second set of bit flipping thresholds in response to determining the codeword remains undecoded as a result of the first minimum number of iterations.

2. The method of claim 1, further comprising:
triggering a stop condition in response to completion of the second minimum number of iterations.

3. The method of claim 1, further comprising:
decoding a third plurality of codewords using a combination of: (1) the first set of bit flipping thresholds for up to a maximum of the first minimum number of iterations and (2) the second set of bit flipping thresholds for up to a maximum of the second minimum number of iterations;
determining the combination does not achieve the second target decoding rate for the third plurality of codewords; and
increasing the first minimum number of iterations and/or the second minimum number of iterations in response to determining the combination does not achieve the target decoding rate.

4. The method of claim 3, wherein the first, second, and third plurality of codewords are a same plurality of codewords.

5. The method of claim 3, wherein the first minimum number of iterations and/or the second minimum number of iterations is increased further in response to determining that a sum of the first minimum number of iterations and the second minimum number of iterations does not satisfy a threshold number of iterations.

6. The method of claim 1, further comprising:
determining a best decoding rate for the decoding of the second plurality of codewords; and
setting the second target decoding rate to a value within a threshold difference of the best decoding rate.

7. The method of claim 6, wherein the threshold difference is an order of magnitude.

8. A non-transitory computer-readable storage medium comprising instructions that, when executed by a processing device, cause the processing device to:
decode a first plurality of codewords using a first set of bit flipping thresholds;
determine a first minimum number of iterations of bit flipping decoding performed on the first plurality of codewords to achieve a first target decoding rate;
decode a second plurality of codewords using a second set of bit flipping thresholds, wherein the first set of bit flipping thresholds are more likely to cause the bit flipping decoding to flip bits than the second set of bit flipping thresholds;
determine a second minimum number of iterations of bit flipping decoding performed on the second plurality of codewords to achieve a second target decoding rate;
flip bits in a codeword using the first set of bit flipping thresholds for the first minimum number of iterations;
determine the codeword remains undecoded as a result of the first minimum number of iterations; and
flip bits in the codeword using the second set of bit flipping thresholds in response to determining the codeword remains undecoded as a result of the first minimum number of iterations.

9. The non-transitory computer-readable storage medium of claim 8, wherein the processing device is further to:
trigger a stop condition in response to completion of the second minimum number of iterations.

10. The non-transitory computer-readable storage medium of claim 8, wherein the processing device is further to:
decode a third plurality of codewords using a combination of: (1) the first set of bit flipping thresholds for up to a maximum of the first minimum number of iterations and (2) the second set of bit flipping thresholds for up to a maximum of the second minimum number of iterations;
determine the combination does not achieve the second target decoding rate for the third plurality of codewords; and
increase the first minimum number of iterations and/or the second minimum number of iterations in response to determining the combination does not achieve the target decoding rate.

11. The non-transitory computer-readable storage medium of claim 10, wherein the first, second, and third plurality of codewords are a same plurality of codewords.

12. The non-transitory computer-readable storage medium of claim 10, wherein the first minimum number of iterations and/or the second minimum number of iterations is increased further in response to determining that a sum of the first minimum number of iterations and the second minimum number of iterations does not satisfy a threshold number of iterations.

13. The non-transitory computer-readable storage medium of claim 8, wherein the processing device is further to:
determine a best decoding rate for the decoding of the second plurality of codewords; and
set the second target decoding rate to a value within a threshold difference of the best decoding rate.

14. The non-transitory computer-readable storage medium of claim 13, wherein the threshold difference is an order of magnitude.

15. A system comprising:
a memory device; and
a processing device, operatively coupled with the memory device, to:
decode a first plurality of codewords using a first set of bit flipping thresholds;
determine a first minimum number of iterations of bit flipping decoding performed on the first plurality of codewords to achieve a first target decoding rate;
decode a second plurality of codewords using a second set of bit flipping thresholds, wherein the first set of bit flipping thresholds are more likely to cause the bit flipping decoding to flip bits than the second set of bit flipping thresholds;

determine a best decoding rate for the decoding of the second plurality of codewords; and set a second target decoding rate to a value within a threshold difference of the best decoding rate;

determine a second minimum number of iterations of bit flipping decoding performed on the second plurality of codewords to achieve the second target decoding rate;

flip bits in a codeword using the first set of bit flipping thresholds for the first minimum number of iterations;

determine the codeword remains undecoded as a result of the first minimum number of iterations; and flip bits in the codeword using the second set of bit flipping thresholds in response to determining the codeword remains undecoded as a result of the first minimum number of iterations.

16. The system of claim 15, wherein the processing device is further to:

trigger a stop condition in response to completion of the second minimum number of iterations.

17. The system of claim 15, wherein the processing device is further to:

decode a third plurality of codewords using a combination of: (1) the first set of bit flipping thresholds for up to a maximum of the first minimum number of iterations and (2) the second set of bit flipping thresholds for up to a maximum of the second minimum number of iterations;

determine the combination does not achieve the second target decoding rate for the third plurality of codewords; and increase the first minimum number of iterations and/or the second minimum number of iterations in response to determining the combination does not achieve the target decoding rate.

18. The system of claim 17, wherein the first, second, and third plurality of codewords are a same plurality of codewords.

19. The system of claim 17, wherein the first minimum number of iterations and/or the second minimum number of iterations is increased further in response to determining that a sum of the first minimum number of iterations and the second minimum number of iterations does not satisfy a threshold number of iterations.

20. The system of claim 15, wherein the threshold difference is an order of magnitude.

* * * * *